E. M. JOHNSON.
FIG TRAP.
APPLICATION FILED FEB. 8, 1918.
1,336,356.
Patented Apr. 6, 1920.
2 SHEETS—SHEET 2.
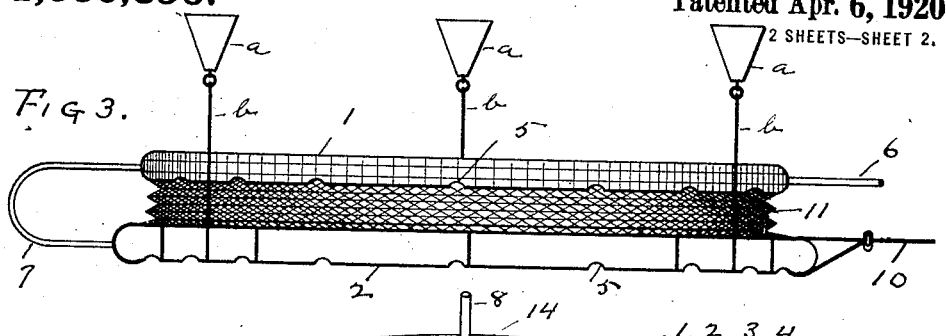
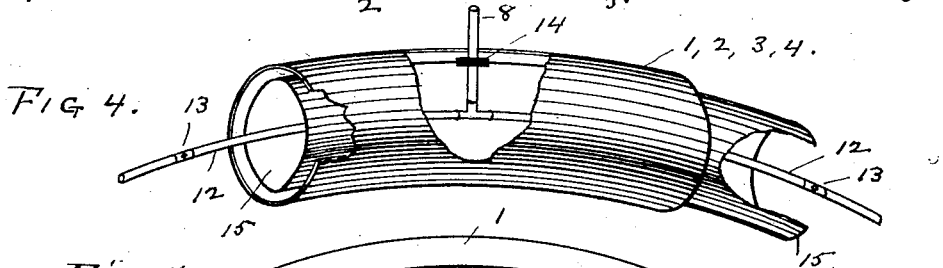
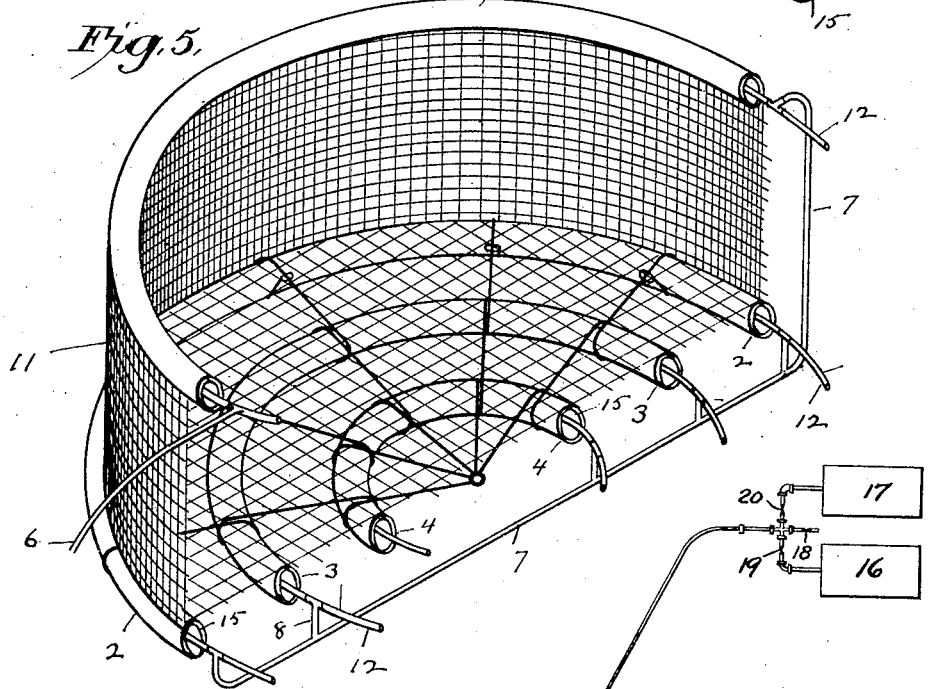
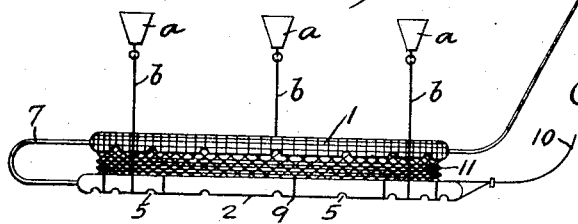
INVENTOR
Eugene M. Johnson
BY
Jas. H. Cary.
ATTORNEY

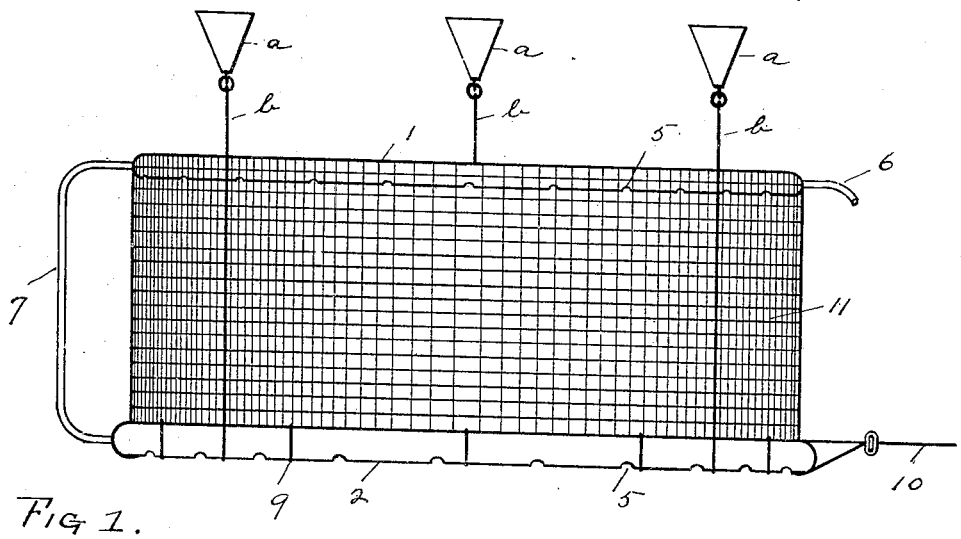
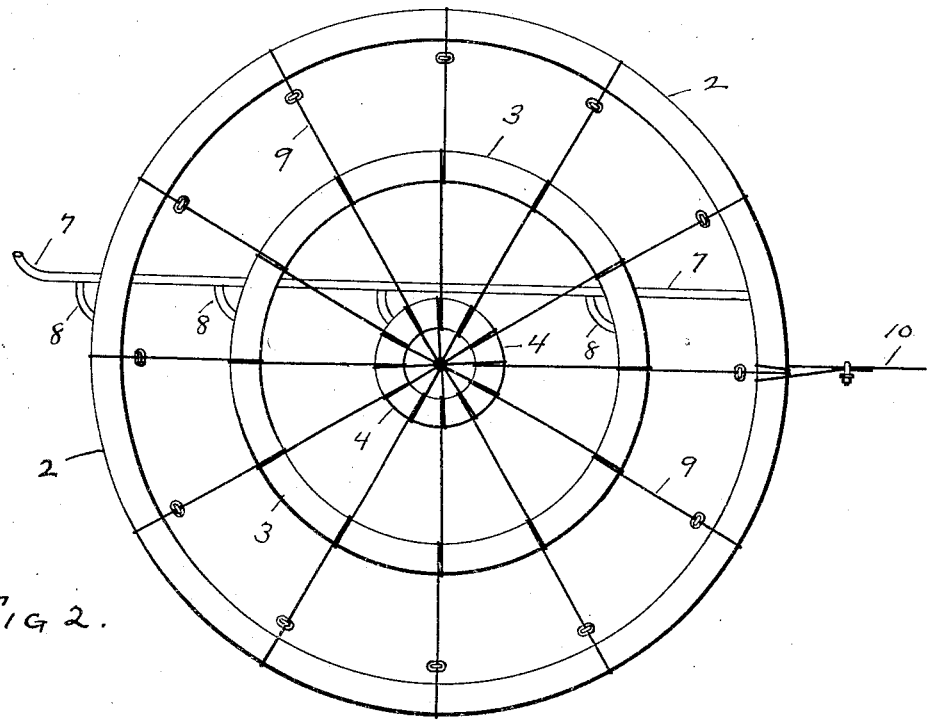

UNITED STATES PATENT OFFICE.

EUGENE M. JOHNSON, OF PORTLAND, OREGON.

FISH-TRAP.

1,336,356.   Specification of Letters Patent.   Patented Apr. 6, 1920.

Application filed February 8, 1918. Serial No. 215,957.

*To all whom it may concern:*

Be it known that I, EUGENE M. JOHNSON, a citizen of the United States, residing at Portland, in the county of Multnomah and State of Oregon, have invented a new and useful Fish-Trap, of which the following is a specification.

My invention relates to a type of fish trap that is submerged and then raised by displacement of the water therein, instead of being pulled or dragged to the surface. Its object is to provide a trap that may at all times be under the control of the operator; that can be used for deep water fishing, sinking to any depth desired, thus permitting of the net fishing at a depth of 30 to 40 fathoms, which with the seines now in use is not practicable. It provides a trap from which the kind and size of fish desired may be taken and the balance returned to the water by simply submerging the trap; that can be used to transport live fish from one locality to another without handling them or injuring them in any way and they may then be removed from the trap as desired. My trap may be used as a stationary trap or a portable trap, or it may be allowed to drift and then be raised to the surface as desired. It reduces very materially the time of the fishing operation, for the trap may be quickly raised to the surface, the fish removed therefrom, then the trap submerged ready to entrap more fish without taking the trap from the water.

Referring to the drawings Figure 1 is a side elevation of the trap showing the net part extended to its full depth. Fig. 2 is a plan of the base or lower section of the trap. Fig. 3 is a side elevation showing the trap collapsed, with the netting gathered between the top and bottom sections. Fig. 4 shows in perspective a section of one of the rings of which the top and bottom parts of the trap is composed, indicating the air hose 12, the inner collapsible tube 15 and the outer casing. Fig. 5 is a perspective view in cross section of the trap with the net extended. Fig. 6 shows diagrammatically the trap and its connection through the air pipe with the air compressor and the exhauster, either of which may be quickly used by manipulating the proper valves.

The top section 1 of the trap is ring like in form, preferably made of metal tubing and perforated as shown at 5, Fig. 1. When the trap is of large diameter, this top section is made of straight pieces of tubing joined together and forming a many sided polygon. A flexible and collapsible inner tubing 15, Fig. 4, is drawn inside of this outer metal casing 1, forming an endless, air tight and water tight tube. An air hose is placed inside of this flexible tube, forming an air passage, with openings 13 at regular intervals, so as to insure an equal distribution, or withdrawal, of the air throughout the flexible tube 15, when it is desired to distend or to collapse the same. The bottom part 2, Fig. 2, is made up of a series of concentrically arranged rings, each one similar to that of the top section, the outer ring 2 being about the same diameter as 1, the ring 3 being of smaller diameter and the ring 4 being in the center. The number of rings depends of course upon the diameter of the trap and the conditions under which it is to be used, the top and bottom sections of the trap being so proportioned that they are capable of displacing a larger amount of water than the weight of the whole trap. Each member of the lower section is provided with an inner flexible tube 15 and an air hose 12, as described for ring 1 of the top section. Also the outer casing of each member 2, 3 and 4 is perforated as shown at 5. The bottom section is covered with wire mesh as shown in Fig. 5 and a twine netting, such as is used in the common seines, joins the top section with the outer ring or member 2 of the bottom section. The air hose 6 leading to the top section 1, is connected with an air compressor 16, Fig. 6, located either on shore, or in a boat. The buoys *a* and the lines *b* allow the trap to be sunk to any depth desired and held there. The lines *b* are attached to the outer ring or member 2 of the bottom part and serve as guides for the top section 1 as it rises between them. To insure the trap rising evenly and to prevent tilting a heavy weight may be suspended directly below the center of the bottom section and held by ropes fastened to the outer ring 2.

In the fishing operation if it is desired to hold the trap stationary it is moored by means of the cable 10, Figs. 1 and 3. If it is to drift, the line 10 is made fast to the boat which accompanies the trap. Suppose the trap to be floating, that is, that there is a sufficient amount of air in the inner flexible tubes 15 of the top and bottom members, 1, 2, 3 and 4 to make the trap buoyant, it is then towed to the place where it is desired to fish and the air allowed to escape from the flexible tubes through the air hose 12 in each of the tubes, and its connections 8, 7 and 6. This is accomplished by opening an exhaust valve or vent 18, Fig. 6, in the air supply pipe or hose 6, which is conveniently located near the air compressor 16. The pressure of the water which enters the casings 1, 2, 3 and 4 through the holes 5 forces the air out of the flexible tubes and collapses them, the casings filling with water and causing the trap to sink to the limit of the lines $b$ which are attached to the buoys $a$, thus holding the trap at any predetermined depth. Or the air can be drawn or pumped out by mechanical means by exhauster 17, Fig. 6, if it is desired to submerge the trap more quickly. By manipulating the compressor and exhauster valves 19 and 20, Fig. 6, the forcing of the air into, or the withdrawing of the air from the pipe 6 can readily be controlled.

The trap may be of large diameter, several hundred feet or so, covering an area of over an acre and still be under perfect control of the attendant. To raise the trap, air is forced through the air supply hose 6 into the flexible inner tube of top section 1; as the pressure increases the tube will expand, displacing the water within the hollow casing, which will be forced out through the holes 5, Figs. 1 and 3. The top section will then become buoyant and will rise, carrying with it the netting 11, Figs. 1 and 5, and assuming the form as shown, like a basket, closed on the sides and bottom, but open on top. The top section will rise first because it not only gets the air first through hose 6, but also because it is under a somewhat lighter pressure than the bottom section and has a less volume of water to displace. As the air pressure increases,—the water having been completely expelled from the top section,— air will be forced through the hose 7 into the flexible tubes within the members 2, 3 and 4 of the bottom part, the water will be expelled therefrom through holes 5 therein, as in the top part, and the whole trap becoming buoyant will rise, imprisoning large numbers of the fish that may happen to be above it. For river fishing at depths of 25 and 30 feet, the sides should be about 6 feet deep; for deep sea fishing about 20 feet, with the variations, of course, that experience may suggest as most suitable for the particular kind of fishing. When traps of large diameter are constructed, it will be necessary to build them in sections and naturally for use in rough water they will have to be built more strongly than those for use in the quiet waters of a river or harbor. The inner flexible tubes are necessary in the traps designed for fishing in rough water, for no matter how much the trap may be tossed about, the air cannot escape from the tubes. For quiet waters, the inner tubes can be dispensed with and the water displaced directly by forcing air into casings designed for that method.

It will be readily seen that this type of trap possesses many advantages over the seines and methods now in use. The operator has control over the trap at all times; he can sink it or he can cause it to float on the surface of the water; he can hold it suspended at any depth; he can tow it to any point desired; he can moor it or so manipulate it as to avoid known snags; if a vessel approaches while the trap is floating and in the channel, it can be quickly sunk out of the way. It supports itself at all times and does not have to be taken into a boat or be hauled ashore. It will permit of fishing in many inaccessible places where a drag net or seine cannot be used. Especially will it be available for deep water or ocean fishing, permitting of trap fishing at depths heretofore impossible. When traps of large area are built, the bottom section may be made up of a series of units like that shown in Fig. 2, or the form of such unit may be triangular, or of any shape deemed most suitable for the design of trap being constructed. It is apparent that there may be many variations in the structure of my trap as herein disclosed, all within the true scope of my invention, for I claim it as broadly new in the art of fishing and in the design of fish traps to cause a submergible trap to rise to the surface by displacement of the water therein.

I claim,—

1. In a fish trap, a submersible top part, a submersible bottom part, a netting covering the bottom part and connecting the outer edges of the top and bottom parts, and collapsible air tight tubes within the top and bottom parts.

2. In a fish trap, a submersible top part consisting of a hollow, perforated, cylindrical ring, an air-tight, collapsible tube within said ring, and an air hose within said collapsible tube.

3. In a fish trap, a series of hollow, perforated, cylindrical rings arranged concentrically, an air-tight collapsible tube within each of the said hollow cylindrical rings, an air hose or pipe within each collapsible tube, and means for joining each hose to a common source of air supply.

4. In a fish trap, a submersible top part consisting of a hollow, perforated, cylindrical ring having an air-tight collapsible tube within, a submersible bottom part consisting of a nest of hollow, perforated, cylindrical rings, each ring having an air-tight collapsible tube within, a netting covering the bottom part and joining the outer edges of the top and bottom parts, and means whereby air may be forced into and withdrawn from each of the said collapsible tubes.

5. In a fish trap, a submersible bottom part consisting of a number of separate units linked together, each unit being composed of a nest of hollow, perforated, cylindrical rings, an air-tight, collapsible tube within each ring and means whereby air may be forced into and withdrawn from each of the collapsible tubes of each unit.

6. In a fish trap, a submersible top part with a hollow, perforated, outer casing, an inner air-tight collapsible tube, an air hose within said collapsible tube and means whereby air may be forced into and withdrawn from the collapsible tube.

7. In a fish trap, a submersible bottom part consisting of a series of members, each with a hollow, perforated, outer casing, an air-tight collapsible tube within each casing, and an air hose within each collapsible tube adapted to be connected with a common source of air supply.

EUGENE M. JOHNSON.